(12) United States Patent
Bamberger et al.

(10) Patent No.: US 11,482,865 B2
(45) Date of Patent: Oct. 25, 2022

(54) METHOD AND DEVICE FOR RECORDING AND EVALUATING AN OUTPUT OF ELECTRICAL ENERGY OF A HYBRID POWER PLANT

(71) Applicant: Siemens Aktiengesellschaft, Munich (DE)

(72) Inventors: Joachim Bamberger, Stockdorf (DE); Michael Bernhard Buhl, Grafing (DE); Florian Steinke, Darmstadt (DE); Jeremy Ralph Wiles, Graefenberg (DE)

(73) Assignee: Siemens Aktiengesellschaft, Munich (DE)

( * ) Notice: Subject to any disclaimer, the term of this patent is extended or adjusted under 35 U.S.C. 154(b) by 668 days.

(21) Appl. No.: 16/314,947

(22) PCT Filed: Jul. 2, 2017

(86) PCT No.: PCT/EP2017/066406
§ 371 (c)(1),
(2) Date: Jan. 3, 2019

(87) PCT Pub. No.: WO2018/007271
PCT Pub. Date: Jan. 11, 2018

(65) Prior Publication Data
US 2019/0312434 A1    Oct. 10, 2019

(30) Foreign Application Priority Data

Jul. 4, 2016    (DE) .................... 102016212092.1

(51) Int. Cl.
G06Q 50/06    (2012.01)
H02J 3/38    (2006.01)
(Continued)

(52) U.S. Cl.
CPC .............. *H02J 3/382* (2013.01); *G06Q 50/06* (2013.01); *H02J 3/008* (2013.01); *H02J 13/00* (2013.01);
(Continued)

(58) Field of Classification Search
CPC .. H02J 3/382; H02J 3/008; H02J 13/00; H02J 3/381; H02J 2300/20; H02J 2300/10;
(Continued)

(56) References Cited

U.S. PATENT DOCUMENTS

2002/0084655 A1*    7/2002   Lof ...................... F03D 7/0284
                                                                         290/44
2009/0032726 A1    12/2009   Ippolito et al.
(Continued)

FOREIGN PATENT DOCUMENTS

| CA | 2790756 | 3/2013 |
|---|---|---|
| DE | 102011054199 | 4/2013 |
| WO | WO2015/105210 | 7/2015 |

OTHER PUBLICATIONS

Jozef Paska, Hybrid power systems—An effective way of utilising primary energy sources, Mar. 19, 2009 (Year: 2009).*
(Continued)

*Primary Examiner* — Resha Desai
*Assistant Examiner* — Ismail A Manejwala
(74) *Attorney, Agent, or Firm* — Cozen O'Connor

(57) ABSTRACT

A method and device which operates to record and evaluate an output of electrical energy of a hybrid power plant, wherein, in accordance with time and/or load, at least one expected generable and usable energy contribution resulting from the utilization of renewable energy sources and one expected energy contribution resulting from the utilization of convention energy carriers are recorded with different tariffs.

10 Claims, 3 Drawing Sheets

(51) Int. Cl.
*H02J 3/00* (2006.01)
*H02J 13/00* (2006.01)

(52) U.S. Cl.
CPC .............. *Y02E 40/70* (2013.01); *Y04S 10/123* (2013.01); *Y04S 50/10* (2013.01)

(58) Field of Classification Search
CPC ......... G06Q 50/06; Y02E 40/70; Y04S 50/10; Y04S 10/123
See application file for complete search history.

(56) References Cited

U.S. PATENT DOCUMENTS

| | | | | |
|---|---|---|---|---|
| 2009/0326726 | A1* | 12/2009 | Ippolito | G06Q 30/0206 700/291 |
| 2010/0145532 | A1* | 6/2010 | Gregory | H02J 3/381 700/286 |
| 2011/0231028 | A1 | 9/2011 | Ozog | |
| 2013/0079931 | A1 | 3/2013 | Wanchoo et al. | |
| 2013/0218356 | A1 | 8/2013 | Lee et al. | |
| 2013/0325199 | A1* | 12/2013 | Coe | H02J 3/004 700/291 |
| 2014/0163756 | A1* | 6/2014 | Idrees | G06Q 50/06 700/291 |
| 2015/0227875 | A1* | 8/2015 | Chillar | G06Q 10/06315 705/7.25 |
| 2017/0279281 | A1* | 9/2017 | Hamm | H02J 3/381 |

OTHER PUBLICATIONS

PCT International Search Report based on PCT/EP2017/066406 dated Sep. 11, 2017.

Office Action dated Oct. 24, 2019 issued in Australian Patent Application No. 2017291859.

* cited by examiner

METHOD AND DEVICE FOR RECORDING AND EVALUATING AN OUTPUT OF ELECTRICAL ENERGY OF A HYBRID POWER PLANT

CROSS-REFERENCE TO RELATED APPLICATIONS

This is a U.S. national stage of application No. PCT/EP2017/066406 filed Jul. 2, 2017. Priority is claimed on German Application No. 102016212092.1 filed Jul. 4, 2016, the content of which is incorporated herein by reference in its entirety.

BACKGROUND OF THE INVENTION

1. Field of the Invention

The invention relates to a device and method for detecting and evaluating an output of electrical energy of a hybrid power plant.

2. Description of the Related Art

What are referred to as electricity meters are generally known for the detection and subsequent evaluation of a supplied/consumed energy quantity.

Hybrid force values generate/supply electrical energy, on the one hand, based on at least one renewable energy source and, on the other hand, based on at least one conventional energy source or based on stored energy. An example of electrical energy supplied on the basis of a renewable energy source can be a photovoltaic installation (PV installation), via which electric current is generated in a manner known per se on the basis of sunlight incident on solar modules encompassed by the installation. Other renewable energy sources, such as wind, and corresponding installations respectively are equally possible. In summary, such installations are referred to below as RE installations (RE=renewable energy source). These installations generally have low specific operating costs (with a high investment requirement at the same time). A diesel generator can be mentioned as an example of electrical energy supplied on the basis of a conventional energy source, via which generator electric current is generated in a manner known per se based on the combustion of diesel fuel. In principle, other conventional energy sources, such as gas or coal, can also be considered here. In summary, such installations are referred to below as CE installations (CE=conventional energy source). These installations have high operating costs because the costs for the fuel must be taken into account.

For operators of such hybrid power plants it would be desirable to be able to support investment plans and the like, at least to a certain extent, by way of a guarantee for the operating costs incurred for the energy quantity output into the respective network. Designers and/or manufacturers of such hybrid power plants provide such guarantees to a certain extent.

SUMMARY OF THE INVENTION

It is accordingly an object of the present invention to provide a method and a device operating in accordance with the method via which, during operation of a hybrid power plant, the relevant, numerical values of a promise of a guarantee can be calculated in respect of the operating costs based on the energy quantity output by the hybrid power plant, also referred to below as the load, and the time profile thereof.

Detection integrating over the time profile of the load, as is performed via electricity meters known per se, is not sufficient for such a calculation. It is therefore important, for example, to detect whether the output occurs at such times in each case at which RE energy quantities that can be generated (on the basis of energy quantities resulting on the basis of a utilization of renewable energy sources) can plausibly be expected, or not—and in which ratio possible RE generation and load are at any instant.

These and other objects and advantages are achieved in accordance with the invention by a method for detecting an output of electrical energy of a hybrid power plant via which an energy contribution that can be expected to be generated and used on the basis of a utilization of renewable energy sources (referred to below as an expected RE energy contribution for short) and an energy contribution that is expected to be generated on the basis of a utilization of conventional energy carriers (referred to below accordingly as the expected CE energy contribution for short) is detected as a function of time and/or load at different "tariffs". Different tariffs illustrate that different specific operating costs are guaranteed by the designers and/or manufacturers of the hybrid power plant for the respective energy quantities. The comparison with the actually incurred costs makes it possible to evaluate the performance of the hybrid power plant and enables the evaluation as to in which scope a possibly provided promise of a guarantee is maintained with respect to the operating costs of the hybrid power plant.

The detection as a function of time and/or load of the expected CE and RE energy contribution at the different tariffs preferably occurs proportionally at any instant, i.e., the current load is not only assigned to exactly one tariff at any instant but can also be distributed in any proportions to two or more tariffs. The proportional detection at different tariffs distinguishes the innovation proposed here, for example, from a detection of an electricity consumption according to a day and a night tariff via two separate meters, in which the load is completely assigned to one of the two tariffs/meters at any instant.

A system-related expected RE energy contribution is preferably measured during the detection as a function of time and/or load of the expected CE and RE energy contributions. A designer/manufacturer of a hybrid power plant can promise the operator of the power plant a system-related expected RE energy contribution to a certain extent, such as in the form of a promise of a guarantee, i.e., in the form of a pledge that the RE installation of the hybrid power plant supplies at least the system-related expected RE energy contribution. The system relatedness of the guaranteed energy contribution takes into account that, for example, an RE installation in the form of a photovoltaic installation cannot supply electricity at night and, furthermore, differences in the energy contribution related to the time of day and time of year are unavoidable. In addition, the usable portion of the RE generation without a storage device (or with a small storage device) at each instant depends on the current energy output of the hybrid power plant; if the load is too small, then possibly not all of the currently generated RE energy can be used and reductions occur. The expected RE energy quantity in a hybrid power plant is therefore dependent on the precise time profile of the load, and not only on its integrated value per year, as would be detected via a conventional electricity meter.

With respect to a device operating in accordance with the method and optionally individual embodiments of the method, the stated object is inventively achieved via a device acting as a detection unit for detecting an output of electrical energy of a hybrid power plant, having means for the detection as a function of time and/or load of an expected RE energy contribution of the power plant and an expected CE energy contribution of the power plant at different tariffs. The invention is preferably implemented in software. The invention is therefore also, on the one hand, a computer program with program code instructions which can be executed by a computer and, on the other hand, a storage medium having such a computer program, in other words a computer program product with program code means, and finally also a detection unit, into the memory of which a computer program of this kind is loaded or can be loaded as a means for carrying out the method and its embodiments. During operation of the detection unit the computer program is run in a manner known per se via a processing unit encompassed by the detection unit in the form of or in the manner of a microprocessor.

Instead of a computer program with individual program code instructions, the implementation of the method described here and in the following can also take place in the form of firmware. It is clear to a person skilled in the art that, instead of an implementation of a method in software, an implementation in firmware is always also possible or in firmware and software or in firmware and hardware. Therefore, for the description presented here, it should apply that the term software or the term computer program also includes other implementation possibilities, namely in particular an implementation in firmware or in firmware and software or in firmware and hardware.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is explained in more detail below with reference to the drawing. Objects or elements corresponding to one another are provided with the same reference characters in all figures, in which.

DETAILED DESCRIPTION OF THE EXEMPLARY EMBODIMENTS

Figure 1:
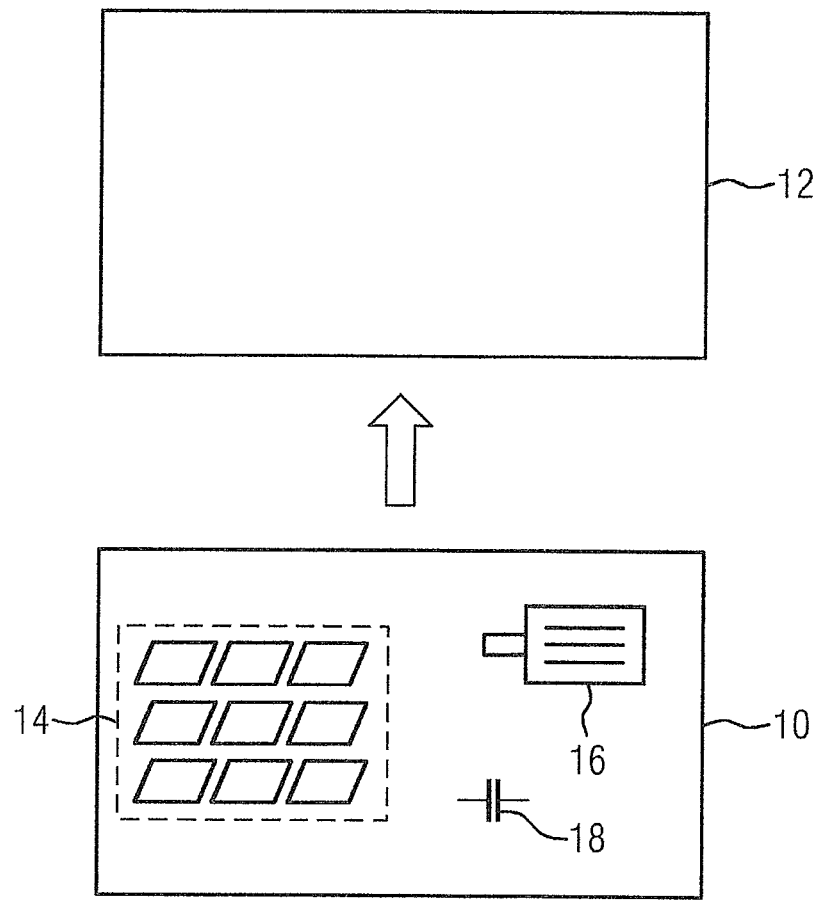
FIG. 1 shows an island network with a hybrid power plant and a technical installation supplied with electrical energy by the power plant in accordance with the invention.

The representation in FIG. 1 shows, in a schematically simplified form, a power plant 10 and a technical installation 12. The power plant 10 generates and supplies electrical energy and accordingly supplies the technical plant 12 with electrical energy and the technical installation 12 draws the electrical energy in the power plant 10. This is shown by the block arrow from the power plant 10 to the technical installation 12. With respect to the generation of electrical energy and the consumption of electrical energy, the power plant 10 and the technical installation 12 together with optionally only a few possible further consumers form a power grid (grid). If only a few subscribers are combined in such a power grid, for example for supplying a technical installation 12 located in a desert region via a hybrid power plant 10, the term "island network" is used in the technical field. The approach proposed here is particularly suitable for island networks of this type.

The power plant 10 comprises means for generating electrical energy using renewable energy sources. In this regard, a photovoltaic installation having individual solar modules encompassed thereby is shown by way of example and schematically in simplified form. Where in the following description reference is made to one photovoltaic installation, other possibilities for generating electrical energy using renewable energy sources, such as wind or water, should always be implicitly understood. In general, the or each installation part that is encompassed by the power plant 10 and via which electrical energy is generated using renewable energy sources, is referred to as an RE installation 14 (RE=renewable energy source). In addition to at least one RE installation 14, the power plant 10 also comprises at least one installation part, via which electrical energy is generated using conventional energy sources, such as fossil energy sources. In this regard, a diesel generator is shown by way of example. In accordance with the above generalization, the or each installation part encompassed by the power plant 10, via which electrical energy is generated using conventional energy sources, is generally referred to as a CE installation 16 (CE=conventional energy source/conventional energy carriers). As the power plant 10 generates electrical energy alternatively or cumulatively using renewable and conventional energy sources, it is a hybrid power plant 10. This optionally comprises at least one energy store 18, which is shown schematically in a simplified form as a capacitor in the illustration in FIG. 1.

The type of technical installation 12 subsequently does not matter. Basically, the type of hybrid power plant 10 does not matter either. What is essential is that the technical installation 12 draws electrical energy from the power plant 10 and that energy generation via the power plant 10 is possible by at least two different installation parts 14, 16, i.e., namely an installation part 14 based on renewable energy sources and an installation part 16 based on conventional energy carriers.

The company that has designed and/or built the power plant 10 usually guarantees to a certain extent the operator thereof an RE energy quantity (energy quantity due to renewable energy) that can be generated and used via the installation part 14 based on renewable energy sources. The operator of the power plant 10 will want to use at least this guaranteed energy quantity, for example, in the technical installation 12, or to sell it, for example, to an operator of the technical installation 12.

The respective technical installation 12 has a specific energy requirement. If the energy requirement cannot be completely covered via the energy quantity that is provided by the RE installation 14 of the power plant 10 as an RE energy quantity, then the missing energy quantity has to be supplemented by an operation of the CE installation 16 and a corresponding CE energy quantity. The operation of the CE installation 16 of the power plant 10 requires the consumption of diesel fuel, for example. The purchase of the diesel fuel represents a cost factor for the operator of the power plant 10. In addition or as an alternative to the guarantee of the RE energy quantity that can be generated and used, the company, which has designed and/or built the power plant 10, can guarantee the operator a consumption of fuels for the CE energy content. With both variants the operator of the hybrid power plant 10 can easily assess the variable operating costs.

For the operator of the power plant 10, it is therefore essential that it complies with the guarantees provided by the manufacturer/designer. Conversely, it is also important for the manufacturer/designer that the provided guarantees are complied with so that no recourse claims can be lodged, and the manufacturer/designer can also successfully supply the market with power plants in the future. Manufacturers or designers of the hybrid power plant 10 or other contracting partners of the operator of the power plant 10 in connection with provided guarantee will be referred to below individually and together as contracting partners (contracting partners of the operator of the power plant 10).

The determination of the RE energy quantity that can be expected to be generated and used using renewable energy sources and the determination of the optionally additional expected CE energy quantity, generated using conventional energy sources, is the central aspect of the innovation proposed here. With the innovation, a promise of a guarantee with respect to the variable operating costs of the power plant 10 can be quantified during the operation of a hybrid power plant 10 and the adherence thereto can be subsequently checked.

Figure 2:
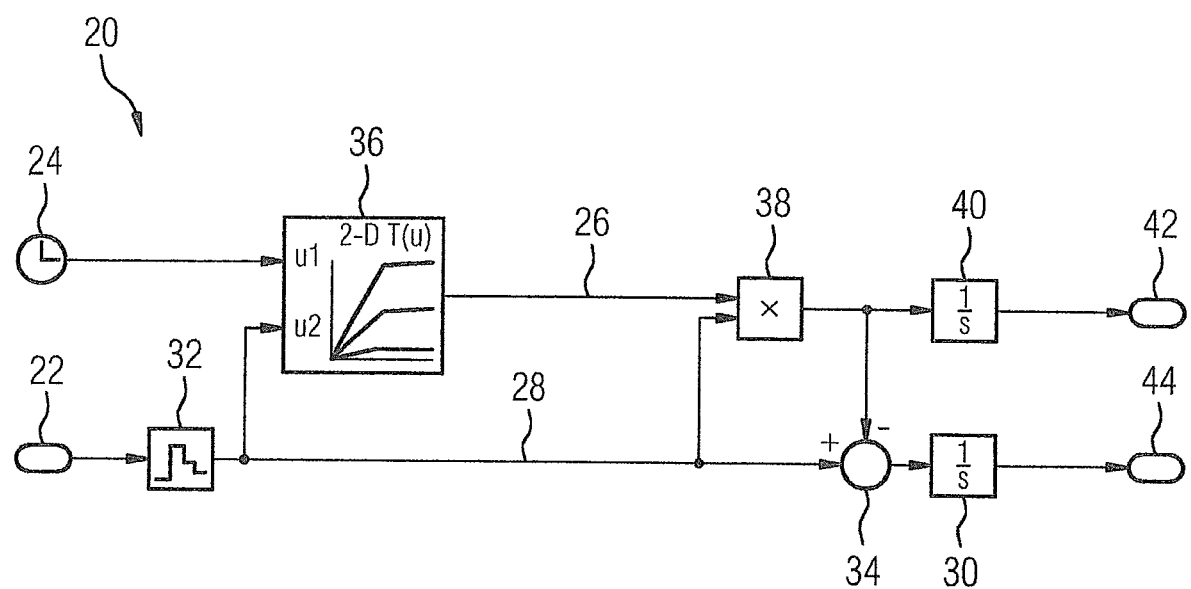
FIG. 2 to FIG. 4 show signal diagrams for illustrating a functionality of a device (detection unit) provided for implementing the method in accordance with the invention.
Figure 3:
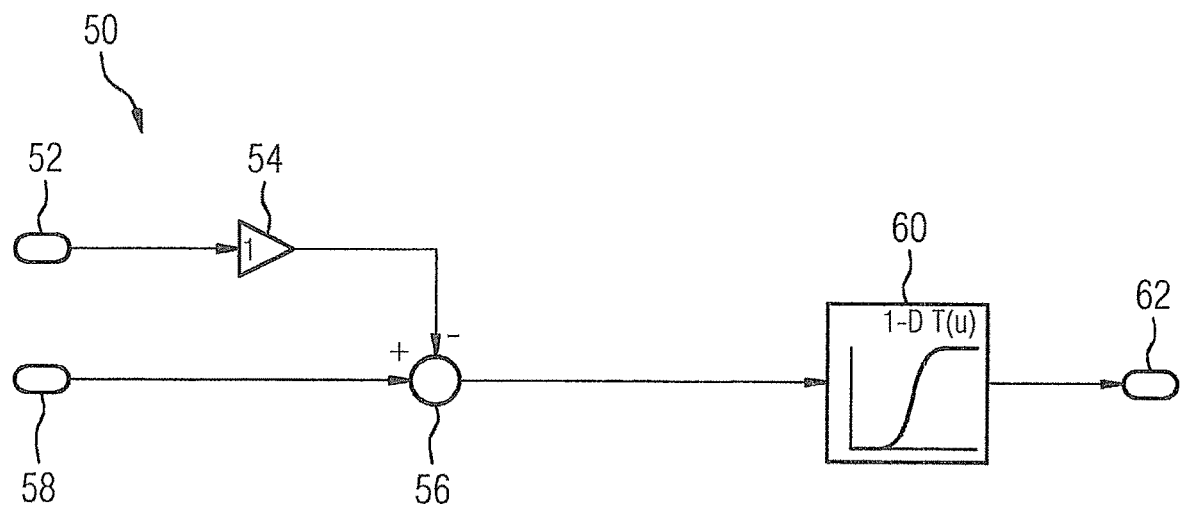
Figure 4:
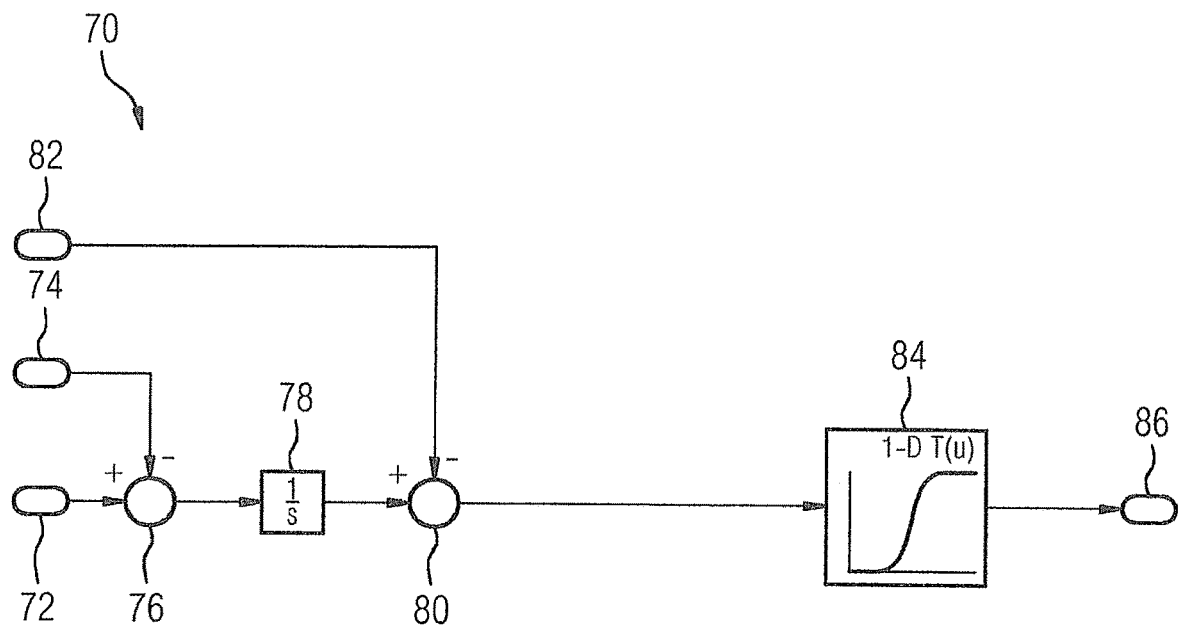

The illustration in FIG. 2 shows, in a schematically simplified form, a signal diagram 20. An implementation of the functionality shown in the form of the signal diagram 20 can be in software, firmware and/or hardware. An implementation of this kind will be referred to below as a functional block. Because the latter comprises the functionality illustrated in the form of the signal diagram 20, the terms signal diagram 20 and functional block are used synonymously in the following and the functional block is also designated accordingly with the reference character of the signal diagram 20. Such a functional block 20 is part of a functionality, in particular a software functionality, of a device (detection unit) intended for implementing the disclosed embodiments of the invention. This also applies to all functional blocks subsequently explained (FIG. 3, FIG. 4).

The functional block 20/signal diagram 20 comprises a first input 22 and a second input 24. At the first input 22 the functional block 20 is supplied with a measure of the energy quantity currently provided by the power plant 10 (equal to the consumption load of the installation 12). At the second input 24 the functional block 20 is supplied with a time value, such as the current time.

In a first (upper) branch 26, an energy quantity calculated according to the first tariff is detected, for example, the RE energy quantity that can be expected and can be used. In a second (lower) branch 28 an energy quantity calculated according to a second tariff is detected, such as the expected CE energy quantity. The remainder of the description is continued based on these exemplary assumptions (first branch 26: expected RE energy quantity; second branch 28: expected CE energy quantity) but without omitting a fundamentally further general validity.

If there is no contribution due to the first branch 26, the functionality of the functional block 20 is reduced to the second branch 28. This comprises an integrator 30 via which, in a substantially conventional manner, in other words comparable to a known electricity meter, the energy quantity supplied at the input 22 is integrated over the duration of the energy output. On the input side, the second branch 28 comprises a basically optional mean value generator 32 via which the energy quantity is averaged during one detection period respectively, in particular a detection period of predetermined or predeterminable duration.

The coupling of the first branch 26 and of the second branch 28 consists in a summation point 34 in the second branch 28 immediately upstream of its integrator 30. With the summation point 34, the expected RE energy quantity determined in the first branch 26 is subtracted from the expected CE energy output taken into account in the second branch 28.

The above-mentioned guaranteed usable RE energy quantity is taken into account in the first branch 26, depending on the time value supplied at the input 24, in particular a time value in the form of the actual time, and as a function of the current load of the power plant 10. In the case of, for example, a photovoltaic installation as an RE installation 14 it should be understood that an RE energy quantity can only be expected if sunshine can also be expected. In addition, this energy can only be used if at the same time (in the case of no or a small energy store 18) a load greater than or equal to the expected RE energy quantity is supplied by the hybrid power plant 10. A representation unit 36 in the first branch 26 takes account of this time dependence of the respectively provided promise of a guarantee.

For better illustration, purely imaginary numbers and two scenarios will be assumed below. If the situation were to be, for example, such that via the RE installation 14 of the power plant 10 in the normal case on a January day between 12:00 and 13:00, an RE energy quantity of 300 kWh can be generated. The expected RE energy quantity available is therefore 300 kWh.

First scenario: if a higher energy quantity is actually generated in the relevant hour via the power plant 10 (input 22), for example 400 kWh, based on the representation function stored in the representation unit 36 a factor 0.75 is obtained (300 kWh/400 kWh=0.75). At a multiplication point 38 in the first branch 26, the output energy quantity (input 22; in the example 400 kWh) is weighted with the factor determined via the representation unit 36. In the example, 400 kWh×0.75=300 kWh is obtained. This value is integrated over time in the first branch 26 via an integrator 40. At the same time, the value determined in the first branch 26 is subtracted in the second branch 28 based on the summation point 34 and, more precisely, from the energy quantity supplied at the input (400 kWh−300 kWh=100 kWh).

The energy quantity output by the RE installation 14 of the power plant 10 (400 kWh in the example) is accordingly calculated as three quarters (300 kWh) in the first tariff (first branch 26). In the second tariff (second branch 28), the result is accordingly a contribution of 100 kWh equal to a quarter of the load. The energy quantity accumulated in the respective tariffs can be read at the outputs 42, 44 of the two branches 26, 28. The further use of these energy quantities for evaluating the output of electrical energy by the power plant 10 in relation to a guarantee is described in the following signal diagrams.

Second scenario: on the other hand, if the power plant 10 generates an energy quantity of, for example, 270 kWh (input 22) in the relative hour, based on the representation function stored in the representation unit 36, the result is a factor of 1.0. At the multiplication point 38 in the first branch 26, the output energy quantity (input 22; in the example 270 kWh) is weighted with the factor determined via the representation unit 36. In the example, 270 kWh×1=270 kWh is obtained. This value is integrated over time in the first branch 26 via the integrator 40. At the same time, the value determined in the first branch 26 is subtracted in the second branch 28 based on the summation point 34 and, more precisely, from the energy quantity supplied to the input 22 (270 kWh−270 kWh=0 kWh).

The energy quantity output by the power plant 10 (contribution of the RE installation 14 plus the contribution of the CE installation 16 to compensate for the deficit) can accordingly be calculated entirely in the first tariff (first branch 26). The further use of this energy quantity for evaluating the output of electrical energy by the power plant 10 in relation to a guarantee is described in the following signal diagrams.

The factor 1.0 determined in the second scenario is obtained via the representation unit 36 based on the circumstance that, in this scenario, the load (270 kWh) can be completely covered by the expected RE energy quantity available (300 kWh). In the first scenario, the situation was different. There the load (400 kWh) goes beyond the expected available RE energy quantity (300 kWh), so the quotient described above is formed via the representation unit 36.

If the RE installation 14 cannot provide any energy contribution as a result of the system, in the case of a photovoltaic installation, for example at night, then the representation unit 36 supplies a factor 0 based on the stored representation function and the time value supplied at the input 24.

To understand the method, it is important that the actual RE or CE energy quantities are not counted in the two tariff meters, but rather the values expected as a function of the load, which can form the basis of a guarantee.

It should be understood the concept illustrated in schematically simplified form in FIG. 2 and explained above can be extended to more than two tariffs. This would be advantageous, for example, if further generation sources with different specific operating costs were still to be present in the hybrid power plant (for example, a gas and steam power plant with average specific operating costs and a set of diesel generators with high specific operating costs).

In a further optional embodiment, in the signal diagram 20, instead of the time value supplied at the input 24, a measured value for the current availability of the renewable energy source, such as a measured value for an irradiation or wind speed measurement, is supplied. This would result in the expected RE component not being calculated as a function of time and load, but as a function of measured RE availability and load. A guarantee with respect to this value would transfer the weather risk from the designer/manufacturer of the hybrid power plant 10 to the operator because the guarantee is now no longer for typical weather but for the actual implementation. This is an example of a detection of the expected RE energy contribution and the expected CE energy contribution which, on the one hand, is load-dependent and, on the other hand, dependent on an instantaneous availability of the respective renewable energy source.

The representation in FIG. 3 shows in schematically simplified form a further signal diagram 50/functional block 50. This is used to evaluate the output of electrical energy of the power plant 10 by the determination of bonus/malus compensation payments by the manufacturer/designer of the power plant 10 to the operator thereof. The functional block 50 takes into account an actual consumption of a conventional energy carrier, such as diesel fuel, in relation to a promise of a guarantee for the power plant 10 in this regard.

At the input 52 the energy quantity accumulated in the second tariff is taken into account (FIG. 2: output 44). The hypothetical set of the energy carrier required to generate the expected CE energy quantity that has accumulated in the second tariff is determined via an amplifier 54 or another functionality for taking into account the expected thermal efficiency of the energy carrier used by the CE installation 16. In the example shown and a CE installation 16 with at least one diesel generator, the hypothetically necessary diesel quantity to generate the energy quantity accumulated in the second tariff is accordingly determined. This quantity is subtracted from an actual diesel consumption (input 58) via a summation point 56. After the summation point 56, the actual higher or lower consumption of fuel is obtained relative to the promise of a guarantee. This value is weighted via an evaluation unit 60 functioning as a representation and/or an evaluation unit. The result of the weighting is, for example, the costs of the respective diesel quantity in the relevant national currency. The determined amount (output 62) is then a basis for possible compensation payments to the operator of the power plant 10. The evaluation unit 60 can also reproduce individual contract conditions between the operator of the power plant 10 and its contracting partner, such as an upper limit for possible compensation payments to the operator or the like. Additionally or alternatively, the evaluation unit 60 can also take into account a lower diesel consumption compared to an expected diesel consumption and a resulting gain by the operator of the power plant 10 in a manner that involves the designer/manufacturer of the hybrid power plant 10 in the benefit to the operator based on the energy contribution of the RE installation 14 of the power plant 10 that is then better than expected.

The representation in FIG. 4 shows (again schematically simplified) a further signal diagram 70/functional block 70. This is likewise intended for determining, for example, compensation payments by the manufacturer/designer of the power plant 10 to the operator thereof. However, it represents a different type of promise of a guarantee, not with respect to the fuel quantity consumed but with respect to the usable RE energy quantity.

At a first and a second input 72, 74, the instantaneous energy contribution of the CE installation 16 or of the entire power plant 10 is supplied to each of the inputs. The energy contribution of the RE installation 14 actually used is determined via a first difference at a summation point 76. The resulting RE energy contribution is integrated over time by an integrator 78. The energy quantity accumulated at the first tariff (FIG. 2: output 42) is subtracted from the resulting energy quantity at a second summation point 80. The result is supplied to the functional block 70 at its third input 82. With the second summation point 80 and the difference there, a comparison is made between the actual RE energy quantity, which is output in the present example to the technical installation 12 or otherwise into an island network, and the guaranteed usable RE energy quantity. A compensation payment between the operator of the power plant 10 and the manufacturer/designer providing the guarantee is calculated via an evaluation unit 84 functioning as a representation and/or an evaluation unit, as in the functional block 50. The result is available at the output 86 of the functional block 70.

Figure 5:
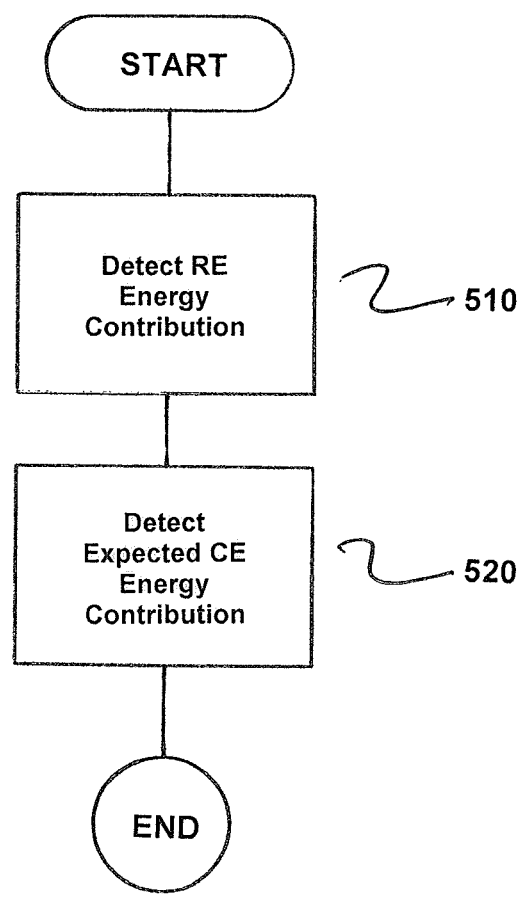
FIG. 5 is a flowchart of the method in accordance with the invention.

FIG. 5 is a flowchart of the method in accordance with the invention. The method comprises detecting at different tariffs, as at least one of (i) a function of time and (ii) a load, at least one RE energy contribution which can be expected to be generated and used resulting on a basis of a utilization of renewable energy sources, as indicated in step 510.

Next, an expected CE energy contribution resulting on a basis of a utilization of conventional energy carriers is detected at different tariffs as at least one of (i) the function of time and (ii) the load, as indicated in step 520.

Individual aspects in the foreground of the description filed here can therefore be briefly summarized as follows: a method and a device operating according to the method for detecting and evaluating an output of electrical energy of a hybrid power plant 10 are disclosed, wherein as a function of time and/or load, at least one RE energy contribution that can be expected to be generated and used resulting on the basis of a utilization of renewable energy sources and an expected CE energy contribution resulting on the basis of a utilization of conventional energy carriers is detected at different tariffs. For example, in the context of detection as a function of time and/or load, a system-related, expected RE energy contribution that can be generated and used is taken into account on the basis of a utilization of renewable energy sources, which contribution the contracting partner of the operator of the hybrid power plant 10 has guaranteed the operator.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for detecting an output of electrical energy of a hybrid power plant, the method comprising:
   detecting, by a device including a processor and memory, a load comprising an energy quantity output by the hybrid power plant at different tariffs, as at least one of (i) a function of time and (ii) the load comprising the energy quantity output by the hybrid power plant, at least one renewable energy source (RE) energy contribution which can be expected to be generated and used resulting on a basis of a utilization of renewable energy sources; and
   detecting, by the device including the processor and memory at the different tariffs, as at least one of (i) the function of time and (ii) the load comprising the energy quantity output by the hybrid power plant, an expected conventional energy source (CE) energy contribution resulting based on utilization of conventional energy carriers to obtain a time profile of the load comprising the energy quantity output by the hybrid power plant based on the RE energy contribution; and
   supplying a technical plant with the electrical energy from the hybrid power plant based on a ratio of the expected CE energy contribution to the time profile of the load comprising the energy quantity output by the hybrid power plant based on the RE energy contribution, said ratio being calculated by the device including the processor and memory;
   wherein at least one of (i) a plurality of RE energy contributions that can be expected to be generated and used resulting based on the utilization of the renewable energy sources comprising different renewable energy sources is detected at each different tariff and (ii) a plurality of CE energy contributions which can be expected to be generated and used resulting based on the utilization of conventional energy carriers comprising different conventional energy carriers is detected at each different tariff.

2. The method as claimed in claim 1, wherein the detection as at least one of (i) the function of time and (ii) the load comprising the energy quantity output by the hybrid power plant occurs at different tariffs and the detection as at least one of (i) the function of time and (ii) the load comprising the energy quantity output by the hybrid power plant at the different tariffs occurs proportionally at any instant.

3. The method as claimed in claim 2, wherein detection of the RE energy contribution and the CE energy contribution occurs as a function of the load comprising the energy quantity output by the hybrid power plant and occurs based on a measured value coded as an instantaneous availability of the respective renewable energy source.

4. The method as claimed in claim 1, wherein detection of the RE energy contribution and the CE energy contribution occurs as a function of the load comprising the energy quantity output by the hybrid power plant and occurs based on a measured value coded as an instantaneous availability of the respective renewable energy source.

5. The method as claimed in claim 1, wherein the expected CE energy contribution resulting based on the utilization of conventional energy carriers is converted via a function into a hypothetically necessary quantity of the conventional energy carrier and is subtracted from an actual consumption of the conventional energy carrier to take into account thermal efficiency of the conventional energy carrier.

6. The method as claimed in claim 5, wherein a result of a subtraction of a determined expected quantity of the conventional energy carrier and the actual consumption of the conventional energy carrier is converted into a value which functions as a basis for future compensation payments or a value representing costs of the conventional energy carrier.

7. The method as claimed in claim 1, wherein an instantaneous CE energy contribution resulting based on the utilization of conventional energy carriers is subtracted from an instantaneous total energy contribution of a hybrid power plant and a result is integrated over time via an integrator;
   wherein the at least one RE energy contribution which can be expected to be generated and used resulting based on the utilization of the renewable energy carriers is subtracted from an energy quantity determined via the integrator; and
   wherein a result of the subtraction is converted via a representation into a value functioning as a basis for future compensation payments.

8. A computer program having program code which implements the method of claim 1 when the computer program is executed on a detector which detects the output of electrical energy of the hybrid power plant.

9. A device for detecting an output of electrical energy of a hybrid power plant comprising:
   a processor;

memory; and at least one integrator;

wherein the processor is configured to:
  detect, as a function of at least one of (i) time and (ii) a load comprising an energy quantity output by the hybrid power plant, a renewable energy source (RE) energy contribution of the power plant which can be expected to be generated and used resulting based on utilization of renewable energy sources and detect, as a function of at least one of (i) the time and (ii) the load comprising the energy quantity output by the hybrid power plant, an expected conventional energy source (CE) energy contribution of the power plant resulting based on utilization of conventional energy carriers at different tariffs to obtain a time profile of the load comprising the energy quantity output by the hybrid power plant based on the RE energy contribution;

wherein the hybrid power plant is operated based on a calculated ratio of the expected CE energy contribution to the time profile of the load comprising the energy quantity output by the hybrid power plant based on the RE energy contribution; and wherein at least one of (i) a plurality of RE energy contributions which can be expected to be generated and used resulting based on the utilization of the renewable energy sources comprising different renewable energy sources is detected at each different tariff and (ii) a plurality of CE energy contributions that can be expected to be generated and used resulting based on the utilization of conventional energy carriers comprising different conventional energy carriers is detected at each different tariff.

10. The device as claimed in claim 9, further comprising:

a computer program loaded into the memory;

wherein execution of the computer program by the processor during operation of the device provides detection as a function of at least one of (i) the time and (ii) the load of the RE energy and the CE energy contributions of the power plant.

* * * * *